United States Patent Office 3,699,054
Patented Oct. 17, 1972

3,699,054
COPPER CHROMITE HYDROGENATION CATALYST REGENERATION PROCESS
Glenn E. Organ, Bay City, and Ronald H. Wile, Kingsville, Tex., assignors to Celanese Corporation, New York, N.Y.
No Drawing. Continuation-in-part of abandoned application Ser. No. 827,935, May 26, 1969. This application Apr. 29, 1971, Ser. No. 138,792
Int. Cl. B01j 11/02, 11/04, 11/68
U.S. Cl. 252—414
15 Claims

ABSTRACT OF THE DISCLOSURE

A spent copper chromite hydrogenation catalyst is restored to a catalytically active condition by a process which comprises (a) washing organic materials therefrom with a volatile solvent, (b) drying the washed catalyst to remove the volatile solvent therefrom, and (c) heating the washed, dried catalyst in an atmosphere comprising molecular oxygen at a controlled temperature.

BACKGROUND OF THE INVENTION

This is a continuation-in-part of patent application Ser. No. 827,935, filed May 26, 1969, now abandoned.

This invention relates to the art of hydrogenation, and more particularly to the processing of hydrogenation catalysts. More specifically it relates to the reactivation of a spent catalyst of the type commonly referred to as "copper chromite," when said catalyst has lost its activity in the course of its being employed in a liquid-phase hydrogenation process.

So-called copper chromite, which is usually a mixture of cupric oxide and cupric chromite, is widely employed as a hydrogenation catalyst. Many hydrogenation process variations are employed, but one common embodiment comprises suspending finely-divided copper chromite in a liquid comprising the feedstock to be hydrogenated, while hydrogen is passed through the suspension under conditions of elevated temperature and pressure. The copper chromite is then removed from the hydrogenation product by any suitable means, such as filtration or centrifugation, and returned to the reaction step for re-use. In the course of the hydrogenation reaction, at a rate which is dependent upon many factors including the nature of the feedstock and the stringency of the reaction conditions being employed, a portion of the copper chromite catalyst is deactivated, with the result that it is necessary, either continuously or intermittently, to withdraw the deactivated material and replace it with fresh copper chromite. The mechanism by which this deactivation takes place can vary from process to process, but basically the deactivation is normally due, at least in part, to chemical reduction of a portion of the catalyst to metallic copper, cuprous oxide, and cuprous chromite. Active copper chromite catalysts ordinarily consist essentially of cupric oxide and cupric chromite.

Ordinarily, in the art as practiced heretofore, the spent copper chromite catalyst is either discarded or sold at a fraction of its original value. The result is a substantial cost to the hydrogenation process, and the art has long recognized the need of a practical method for restoring the spent catalyst to an active condition.

It is an object of the present invention to provide a method for regenerating spent copper chromite catalyst. It is another object to provide a method for reducing the consumption of catalyst in a process in which copper chromite catalyst is employed in hydrogenating an organic feedstock. It is a particular object to provide a method for reducing catalyst consumption in a process in which an alcohol or polyol ester of an alkanoic, hydroxyalkanoic, or dialkanoic acid is hydrogenated to form a hydroxy compound corresponding to said acid or in which lactones or polylactones are similarly hydrogenated to form the corresponding alkanediol.

Other objects will be apparent from the following detailed description and examples.

SUMMARY OF THE INVENTION

In accordance with the present invention a spent copper chromite catalyst, typically admixed with, or wetted with, an organic material with which the copper chromite has been in contact during its employment as a hydrogenation catalyst, is reactivated and restored to a catalytically active state by subjecting it to the following operations:

(1) The catalyst is washed with a volatile liquid in which the organic material with which the catalyst is admixed is soluble.
(2) The washed catalyst, now substantially free of organics other than residual quantities of the volatile solvent, is freed from the residual solvent, advantageously by drying.
(3) The dried catalyst is then heated, in an atmosphere comprising molecular oxygen, at a controlled elevated temperature whereby the catalyst is reoxidized to copper chromite (i.e. a mixture of cupric oxide and cupric chromite).

The oxidized catalyst, after cooling, is suitable for re-use as catalyst in the hydrogenation process. "Hydrogenation" refers here to what is sometimes termed "hydrogenolysis," i.e. the conversion of a carboxylic acid to the corresponding hydroxy compound having the same number of carbon atoms.

DESCRIPTION OF THE PREFERRED EMBODIMENTS

The catalyst to the reactivation of which the process of this invention is ordinarily applied is the material which is known in the art as "copper chromite" although it will be recognized that this material is, ordinarily, actually a mixture which consists essentially of cupric oxide and cupric chromite. The process of the invention can be applied to the pure components if desired, but the mixture just described is ordinarily what is employed as a hydrogenation catalyst. The catalyst will typically be in a more or less finely subdivided form, e.g. about 5 to 100 microns, but it may also, if desired, be employed as particles or chunks of larger size. Inasmuch as the catalytic activity, the deactivation phenomena, and reactivation process as described herein are all basically surface phenomena, the applicability of the invention is not controlled by catalyst particle size.

The nature of the organic material with which the spent catalyst is admixed is important only insofar as it dictates the choice of volatile solvent used to wash or leach it from the catalyst particles. In the event this organic material should happen already to be a volatile liquid, the washing step of the process could actually be dispensed with, since in this event the organic material could be removed by simple drying. Ordinarily, however, the spent catalyst will have been employed in a hydrogenation process entailing contact with some relatively non-volatile reactant, product, or solvent. For example, copper chromite is employed in the catalytic hydrogenation of esters, including diol esters and glycerides, of carboxylic acids, hydroxycarboxylic acids, and dicarboxylic acids having, for example, about 4 to 20 carbon atoms to prepare the hydroxy-containing derivatives formed by replacing the carboxylate groups with hydroxy groups. The alcohol moiety of the esters so hydrogenated may be an alkanol, or a polyhydroxyalkane such as a diol or glycerine. Thus the copper chromite catalyst as recovered after the hydrogenation step in any of these processes will typically be admixed with, e.g. wetted by, the product of the hydrogenation reaction. This will very commonly be, although the invention is not restricted to the processing of such materials, an alcohol or an alkanediol having from about 4 carbon atoms to about 20 carbon atoms. A significant quantity of the hydrogenation precursor of the organic compound may also be present, e.g. methyl adipate or the 1,6-hexanediol esters of adipic or hydroxycaproic acids when the product of the hydrogenation reaction is 1,6-hexanediol or a laurate ester when the product is to be lauryl alcohol.

The process of the present invention is broadly applicable to regenerating spent copper chromite catalyst which has been employed in hydrogenating a lactone, such as epsilon-caprolactone, a polymeric lactone (which is a polyester of a hydroxycarboxylic acid), or any ester of a monohydroxy or polyhydroxy alkane with an alkanoic acid, a hydroxyalkanoic acid, or an alkanedioic acid to form a hydroxy compound corresponding to the acid. It will be recognized, of course, that mixtures of such esters can be hydrogenated to form the hydroxy derivatives of the acids, as can be mixed esters of polyhydroxy compounds such as glycerin. More particularly, in addition to the conversion of lower alkanediol esters of dicarboxylic, hydroxycarboxylic, and carboxylic acids to produce lower alkanoic acids and lower alkanediols as previously discussed, copper chromite catalyzed hydrogenation is commercially useful in converting higher alkanoic acids such as stearic and lauric acid to the corresponding alcohols by hydrogenating the corresponding alkyl alkanoate (in which the alcohol moiety may be a lower alkanol or a higher alkanol having up to, for example, about 20 carbon atoms) or an ester of one of these acids with a trihydroxy lower alkane, such as glycerin. The esters of dihydroxy lower alkanes are also, of course, equally susceptible to hydrogenolysis although the glycerides are a convenient naturally-occurring source. Simple alkanol esters and glycerides are the most useful raw materials for obtaining, by hydrogenation or hydrogenolysis, the alkanols corresponding to such higher alkanoic acids as caprylic, pelargonic, lauric, myristic, palmitic, stearic, and higher acids such as carnubic. The present process is applicable in regenerating spent copper chromite employed in hydrogenating, or hydrogenolyzing, the esters of all such acids to form the corresponding alcohol derivatives. It will be recognized in addition that esters of unsaturated acids, such as oleic, can be hydrogenated with copper chromite to form alcohols corresponding to the corresponding saturated acids. This incidental conversion of the unsaturated acid to the corresponding saturated alcohol is a known characteristic of such hydrogenations when carried out with ordinary copper chromite, and the characteristics of the spent copper chromite catalyst from such processes are the same, insofar as regenerability is concerned, as those of copper chromite which has been employed in hydrogenating the corresponding saturated acid esters.

In washing the spent catalyst to remove the organic admixture therefrom, the solvent employed must be one in which the organic component of the spent catalyst mass is soluble, and it should be a liquid which has substantial volatility in order that, after the washing step, it can be removed from the washed catalyst by vaporization therefrom. It will be recognized that, given a particular composition of organic material in the spent catalyst mass, simple testing will reveal a very large number of volatile solvents which will dissolve the organic admixture. Lower ketoalkanes and hydroxy alkanes are applicable in most instances, and acetone and methanol have been found to be particularly effective, as well as economical, in processing a spent catalyst which has been employed in hydrogenating lower alkanediol esters of adipic acid, hydroxycaproic acid, and caprolactone to produce 1,6-hexanediol. Even water can be employed with this mixture, since alkanediols are highly soluble in water, but the use of water does not result in so high a degree of catalyst reactivation as does the use of the organic solvents such as acetone and methanol. The organic solvents are essential, of course, when the ester being processed is an ester of a higher acid such as lauric or stearic.

In washing the spent catalyst with the volatile solvent, it is desirable that substantially all of the organic admixture initially present in the spent catalyst be removed in the solvent wash. However, so long as substantially all of the organic admixture is removed, there is no critical residual quantity of such admixture the presence of which will frustrate the purpose of the process. For example, adequate cleansing of the catalyst results when the spent catalyst mass, in the form of, for example, wet filter cake or concentrated slurry discharge from a solid-bowl centrifuge, is slurried in the volatile solvent in an amount of about two volumes of solvent per volume of wet catalyst mass, followed by filtering or centrifuging the catalyst from the resulting slurry and washing it one additional time with the solvent in an amount of about one volume of solvent per volume of wet catalyst mass.

Aside from the technique just described of slurrying in the solvent, filtering or centrifuging, and washing again with the solvent, other techniques well known in the art for displacing the organic admixture of the catalyst mass with volatile solvent can be employed. For example, a slurry of the catalyst suspended in liquid product of the hydrogenation reaction in which the catalyst has been employed can be fed into a clarifying centrifuge. The liquid component of the slurry fed to the centrifuge is withdrawn as clarified overflow, while a stream of the volatile solvent is fed into the thickened underflow discharge port of the centrifuge, countercurrent to the thickened underflow slurry of catalyst being discharged from the centrifuge. A countercurrent washing is thus effected, and the catalyst is recovered in the form of a slurry the liquid component of which is the volatile solvent.

After the catalyst has been freed from the organic admixture initially present by washing with the volatile solvent by, for example, ordinary filtration and drying methods entailing no particular novelty. Preferably, of course, the drying is carried out in equipment which comprises facilities for recovering the solvent vapors. It is preferred that substantially all of the volatile solvent be removed from the catalyst both for the sake of economy in use of the solvent and also because, in the regenerating operation which is to follow, excessive quantities of solvent vapors can create an explosion hazard. In view of these considerations, it is recommended that the catalyst be dried until it contains no more than about one weight percent of the volatile solvent. Drying temperature is not critical, but temperatures in the range of about 100° C. to 150° C. are recommended in the interest of rapid and complete removal of solvent. An inert atmosphere should be maintained in the drier.

After the drying step the washed, dried catalyst is then contacted with molecular oxygen at an elevated temperature while being agitated so as to prevent the formation of zones of localized overheating. During this step of the process the catalyst is regenerated by being re-oxidized to form the catalytically active "copper chromite." This step can be conducted in any apparatus designed to contact a bed of solids with a circulating stream of heated gas. Rotary kilns can be employed, as well as shelf-type driers. Driers of the type comprising a screw conveyor with heated flights are suitable, as well as fluidized-bed driers.

Temperature, heating time, and oxygen content of the oxidizing gas with which the catalyst is contacted are the important parameters of this process step. Regarding oxygen content of the gas, it is recommended that this be controlled below about 15% by volume, preferably below 14%. A particularly suitable concentration is about 10%, with the remaining 90% being an inert gas, e.g. nitrogen. When the oxygen concentration is above about 14%, and particularly if it is above about 15%, it has been discovered that ignition or explosion of the catalyst dust can occur, constituting a safety hazard and also rendering temperature control difficult. Aside from these considerations it is possible, if desired, to regenerate in air.

With respect to the temperature to be maintained in the regeneration step of the process, it has been discovered that a temperature of approximately 110° C. is required to initiate the oxidation reaction by which the catalyst is regenerated. Temperatures of at least 120° C., preferably 140–150° C. are recommended as a minimum. Temperatures much above about 150° C. are not necessary to initiate the reaction. Temperature recommended for the regeneration reaction after initiation depends somewhat upon the concentration of cuprous chromite in the spent catalyst as compared with the concentration of cupric chromite (typically the catalyst, even though it is spent, will contain still a substantial proportion of cupric chromite). When the spent catalyst contains around 10% cuprous chromite, an oxidation temperature of 150° C. to 200° C., maintained for about 45 minutes, results in a high degree of reactivation. When the concentration of cuprous chromite is higher, e.g. around 20%, it is recommended that the temperature employed be around 400° C. and that this temperature be maintained for about 60 minutes. Cuprous chromite content is conveniently determined by thermogravimetric analysis, at a temperature of at least 900° C., in comparison with a standard of cuprous chromite-free copper chromite.

With respect to the residence time employed in the regeneration step, about one hour, at the temperatures set forth immediately above, is recommended. This is not critical, however, residence times as low as about 15 to 30 minutes resulting in a substantial, although incomplete, degree of catalyst activation while residence time as high as about four hours at 400° C. have no adverse effect. Temperatures above about 500° C. may have a detrimental effect on the catalyst.

Broadly speaking, the regeneration step should be carried out at 100° C. to 500° C., at a reaction time of at least 15 minutes. More particularly, 150° C. to 450° C. for 45 minutes to 90 minutes is recommended, and 250° C. to about 400° C. for 45 minutes to about 90 minutes is especially preferred.

The effect of organic matter, especially combustible organic matter, in the catalyst fed to the regenerator is not deleterious so long as the quantity is not sufficient to result in localized overheating (due to combustion of the organic matter) of the catalyst being oxidized. That is, so long as it is possible to control the temperature in the regenerator below about 500° C., preferably not higher than about 450° C., any organic matter in the catalyst is simply burned without adverse effect on the catalyst.

After completion of the oxidation or regeneration step just described, the oxidized catalyst is cooled and is then ready for re-use as a hydrogenation catalyst.

The following examples are given to illustrate the invention further. It will be understood that these examples are given by way of illustration and that, within the scope of the invention, many variations can be made therein.

EXAMPLE I

In a process in which 1,6-hexanediol and lesser quantities of 1,4-butanediol and 1,5-pentanediol were produced by the copper chromite-catalyzed liquid-phase hydrogenation of the 1,6-hexanediol esters of a mixture comprising predominantly adipic acid, epsilon-hydroxycaproic acid, and caprolactone along with lesser quantities of the corresponding 4- and 5-carbon atom homologs, there was recovered a catalyst slurry comprising finely-divided, partially-reduced copper chromite suspended in the product of the hydrogenation reaction, which comprised predominantly 1,6-hexanediol. As contained in this slurry, the spent catalyst had a catalytic activity which was approximately 15% of that characteristic of fresh catalyst prior to use in the same hydrogenation reaction. The fresh catalyst from which this spent catalyst was derived was a so-called "copper chromite" comprising, by X-ray diffraction analysis, approximately 50 weight percent cupric oxide and 50 weight percent cupric chromite. The slurry contained approximately 20 weight percent solids.

The slurry was diluted with acetone, in an amount of about 4 volumes of acetone per volume of slurry, after which the solids were removed from the resulting diluted slurry by filtration. The separated solids were dried by drawing air through the filter cake until the cake was dry to the touch. At this stage the cake contained about 40 weight percent solvent.

The filter cake was then dried, in air, at a temperature of approximately 120° C. for 3 hours. During this heating operation it was noted that some of the material became incandescent, indicating an oxidation reaction. After the heating, the solids were allowed to cool and then were tested for catalytic activity in the same hydrogenation process in which the material had been previously employed. The reactivated material was found to be equal in catalytic activity to the fresh copper chromite catalyst originally employed. However, it lost activity, in use, at a somewhat higher rate than that characteristic of fresh catalyst. When the heating-oxidation step was conducted for 3 hours at temperatures in the range of 140° C. to 150° C., it was found that the reactivated catalyst had both the activity and the durability of fresh copper chromite.

EXAMPLE II

From a hydrogenation reactor in which a suspended copper chromite catalyst is being employed in the hydrogenation of a mixture of lower alkanediol esters, predominantly 1,6-hexanediol esters, of adipic acid, epsilonhydroxycaproic acid, and caprolactone to produce 1,6-hexanediol, there is continuously drawn off a liquid reaction product comprising predominantly 1,6-hexanediol along with lesser quantities of butanediol and pentanediol as well as minor amounts of monohydric alcohols and other reaction by-products. This product comprises about 1075 lbs. per hour of suspended copper chromite and 35070 lbs. per hour of organics, largely hexanediol. An additional 3343 lbs. per hour of an aqueous suspension containing 43 lbs. per hour of copper chromite is added to this reaction product, this aqueous suspension comprising the product from a dust scrubber, to be described below, employed in recovering regenerated catalyst fines. This stream is added at this point solely for the purpose of recovering the catalyst fines from the dust scrubber effluent. Into the mixture just described there is continuously incorporated three pounds per hour of a flocculent, to improve centrifugation efficiency in a thickening step which is to follow. There is also added, in order to reduce viscosity, 12729 lbs. per hour of a liquid comprising 60 lbs. per hour of catalyst fines, 3985 lbs. per hour of the liquid reactor product just described, 8309 lbs. per hour of methanol, and 375 lbs. per hour of water.

The combined liquid streams just described are then passed through a thickening centrifuge, the overflow from which, comprising predominantly clarified liquid and amounting to 46302 lbs. per hour, is forwarded to a hydrogenation product recovery system the operation of which is outside the scope of the present invention.

The underflow from the thickening centrifuge amounts to 5875 lbs. per hour and contains 1100 lbs. per hour of suspended catalyst, 4000 lbs. per hour of liquid reaction product, 400 lbs. per hour of methanol, and 375 lbs. per hour of water. This underflow stream is forwarded to a methanol-washing system comprising two horizontal scroll-type centrifuges, operating in series, each being preceded by a repulping vessel. The material is first mixed, in the first pulping vessel, with 8115 lbs. per hour of a liquid, consisting of centrifugate produced by the second of the scroll-type centrifuges and containing 70 lbs. per hour of suspended catalyst, 209 lbs. per hour of hydrogenation reactor product, 7573 lbs. per hour of methanol, and 263 lbs. per hour of water. Also added to this repulping vessel is 590 lbs. per hour of methanol, a minor recycle stream which it is convenient to reinsert into the system at this point.

The resulting mixture is thoroughly agitated, continuously, in the repulping vessel and is a continuously drawn off therefrom to be fed into the first of the scroll-type centrifuges. From this centrifuge the centrifugate, amounting to 12729 lbs. per hour, is returned as diluent to the feed of the thickening centrifuge, as previously described. The wet cake produced in this first scroll-type centrifuge, containing about 60% solids and the remainder methanol and hydrogenation reactor product, is forwarded to a second repulping vessel in which it is reslurried with 8013 lbs. per hour of methanol. The resulting slurry then passes to the second of the two scroll-type centrifuges. from which the centrifugate, amounting to 8115 lbs. per hour, is returned to the first repulping vessel, preceding the first scroll-type centrifuge, as already described.

The wet solids produced by the second scroll-type centrifuge amount to 1760 lbs. per hour and contain 1044 lbs. per hour of solid catalyst, 15 lbs. per hour of hydrogenation reaction product (predominantly 1,6-hexanediol), 694 lbs. per hour of methanol, and 17 lbs. per hour of water. These wet solids are forwarded to a steam-heated drier the interior of which, for reasons of safety, is kept slightly above atmospheric pressure with nitrogen. Drier steam pressure is approximately 60 p.s.i.g., and the interior (i.e. process) temperature is controlled at approximately 120° C. The methanol vapors evolved from the drier are condensed and, amounting to 590 lbs. per hour, constitute the minor recycle stream previously referred to as having been introduced into the first of the two repulping vessels.

Upon leaving the drier the dried catalyst, containing typically less than about one weight percent organic material, is then forwarded, through a rotary feeder, to a regenerator in which it is contacted, at an elevated controlled temperature, with molecular oxygen in order to accomplish the final, reoxidation, step of the process.

The regenerator comprises an enclosed screw conveyor having a jacketed housing and hollow flights through which a hot oil is passed at a controlled rate such as to maintain a set process temperature in the solids being conveyed by the conveyor flights through the housing. The conveyor is sized such that the retention time of the solids passing therethrough is between about 45 and 120 minutes, typically about 60 minutes. The regenerator is surmounted by a plenum chamber, communicating with substantially the entire length of the conveyor housing so that gases passing through the conveyor in contact with the solids can be drawn off through the plenum chamber without entraining an excessive quantity of fine solids from the conveyor. A mixture of nitrogen and oxygen, containing about 10% oxygen and the remainder nitrogen, is passed, by way of the plenum chamber, through the heated conveyor and out again through the opposite end of the plenum chamber. Such suspended catalyst as is entrained in the gas mixture leaving the heated conveyor is scrubbed therefrom with water and, at 3343 lbs. per hour of a mixture containing 43 lbs. per hour of solids and the remainder water, is recycled to the feed of the thickening centrifuge as previously mentioned.

The process temperature maintained in the regenerator, i.e. the temperature of the heated catalyst passing therethrough, is approximately 449° C. Because the oxidation reaction occurring in the regenerator is exothermal, the hot oil circulating through the hollow flights of the conveyor is actually employed not to heat the conveyor but to cool it. The temperature of the circulating hot oil is, therefore, lower than the process temperature except when, as in first starting up the regenerator, it is necessary to initiate the oxidation reaction by applying heat. Typically, the temperature of the circulating hot oil is about 260° C.

The solids discharged from the regenerator, now comprising reoxidized copper chromite, are cooled to approximately ambient temperature and are now suitable for reuse as hydrogenation catalyst.

It will be recognized that what has been described in Example II is a completely integrated industrial operation and that, in smaller-scale applications of the invention, substantial process simplifications can be made along the lines of the simpler operation described in Example I.

EXAMPLE III

Twelve grams of copper chromite, which had been employed in converting 1,6-hexanediol esters of predominantly 6-carbon atom difunctional acids to 1,6-hexanediol as described above, was recovered from the hydrogenation reactor product by filtration and was then washed thoroughly with acetone and dried in air at room temperature. The 12 grams of air-dried catalyst were then mixed with 150 grams of methyl stearate, and the mixture was placed in an autoclave and maintained therein for 150 minutes at 250° C. in contact with hydrogen at 240 atmospheres pressure. At the end of this time the autoclave was cooled and depressured and the contents analyzed chemically. It was found that, of the methyl stearate initially charged, 96% had been converted to octadecanol.

The spent catalyst was filtered from the octadecanol hydrogenation product, washed thoroughly with acetone, and dried in the presence of air for 1 hour in a laboratory oven maintained at 150° C. After the treatment at 150° C., the catalyst was then transferred to a laboratory furnace and treated therein, in the presence of air, at 500° C. for 15 minutes to complete regeneration.

The regenerated catalyst was then removed from the furnace and allowed to cool in air, after which 8 grams of the cooled catalyst was employed as catalyst in the hydrogenation of 392 grams of an ester mixture, substantially identical with that described in Examples I and II above, comprising predominantly 1,6-hexanediol esters of a mixture comprising predominantly adipic acid, hydroxycaproic acid, and caprolactone along with lesser quantities of the 4- and 5-carbon atom homologs. The hydrogenation was carried out for 150 minutes at a temperature of 275° C. and under a hydrogen pressure of approximately 306 atmospheres. A good yield of 1,6-hexanediol was produced, activity of the regenerated catalyst being as high as that obtained in Examples I and II above in which the spent catalyst prior to regeneration had been employed only for hydrogenating the alkanediol esters of adipic acid, hydroxycaproic acid, etc. as described in those examples. The regenerated catalyst was equally suitable for further use in hydrogenating additional quantities of methyl stearate, which is in fact more readily hydrogenated to alkanol derivatives than in the mixture of alkanediol esters just described.

The embodiments of the invention in which an exclusive property or privilege is claimed are defined as follows:

1. A method for regenerating a spent copper chromite hydrogenation catalyst which has been employed in hydrogenating a lower alkanediol ester of at least one member of the group consisting of adipic acid, ε-hydroxycaproic acid, and caprolactone to 1,6-hexanediol, said spent catalyst being in admixture with organic material which comprises predominantly the liquid product obtained in said hydrogenation, which process comprises the steps of:

(a) washing said catalyst with a volatile liquid which is a solvent for said organic material and which is a member of the group consisting of lower ketoalkanes and lower hydroxyalkanes to remove substantially the entirety of said organic material from said catalyst;

(b) drying the washed catalyst to remove therefrom substantially the entirety of the solvent remaining in admixture therewith after said washing step; and (c) oxidizing the washed dried catalyst by contacting it at a temperature between about 100° C. and 500° C. for at least about 15 minutes with an oxidizing gas consisting essentially of molecular oxygen and an inert gas.

2. The process of claim 1 wherein the oxidizing gas contains up to about 15 volume percent oxygen.

3. The process of claim 1 wherein the volatile solvent is a member of the group consisting of lower ketoalkanes and lower hydroxyalkanes.

4. The process of claim 2 wherein the solvent is a member of the group consisting of acetone and methanol.

5. The process of claim 4 wherein the organic material comprises predominantly at least one lower alkanediol.

6. The process of claim 4 wherein the organic material comprises at least one member of the group consisting of 1,4-butanediol; 1,5-pentanediol; and 1,6-hexanediol.

7. The process of claim 6 wherein the volatile solvent is methanol.

8. The process of claim 6 wherein the volatile solvent is acetone.

9. A method for regenerating a spent copper chromite catalyst which has been employed in hydrogenating an ester of a monohydroxy or polyhydroxy alkane with an acid which is a member of the group consisting of hydroxyalkanoic acids, alkanedioic acids, and alkanoic acids to form a hydroxy compound corresponding to said acid, said spent catalyst being in admixture with organic material comprising predominantly the liquid product obtained in said hydrogenation, which process comprises the steps of:

(a) washing said catalyst with a volatile liquid which is a solvent for said organic material and which is a member of the group consisting of lower ketoalkanes and lower hydroxyalkanes to remove substantially the entirety of said organic material from said catalyst;

(b) drying the washed catalyst to remove therefrom substantially the entirety of the solvent remaining in admixture therewith after said washing step; and (c) oxidizing the washed dried catalyst by contacting it at a temperature between about 100° C. and 500° C. for at least about 15 minutes with an oxidizing gas consisting essentially of molecular oxygen and an inert gas.

10. The process of claim 9 wherein the oxidizing gas contains up to about 15 volume percent oxygen.

11. The process of claim 10 wherein the volatile solvent is a member of the group consisting of lower ketoalkanes and lower hydroxyalkanes.

12. The process of claim 11 wherein the solvent is a member of the group consisting of acetone and methanol.

13. The process of claim 12 wherein the ester is a member of the group consisting of alkyl alkanoates of dihydroxy and trihydroxy lower alkanes.

14. The process of claim 13 wherein the ester is a member of the group consisting of alkanol esters and glycerides.

15. The process of claim 14 wherein the ester is an alkyl ester of a higher alkanoic acid and the hydrogenation product comprises the alkanol corresponding to said alkanoic acid.

References Cited

UNITED STATES PATENTS

| | | | |
|---|---|---|---|
| 1,933,508 | 10/1933 | Peck | 252—414 X |
| 2,784,238 | 3/1957 | Jacobs et al. | 252—414 X |
| 3,267,157 | 8/1966 | Bunji Miya | 252—420 X |

FOREIGN PATENTS

| | | | |
|---|---|---|---|
| 1,392,243 | 2/1965 | France | 252—419 |
| 199,838 | 9/1967 | Russia | 252—414 |
| 1,038,256 | 8/1966 | Great Britain | 252—413 |

DANIEL E. WYMAN, Primary Examiner

P. E. KONOPKA, Assistant Examiner

U.S. Cl. X.R.

252—416, 419; 260—635 D, 638 A

UNITED STATES PATENT OFFICE
CERTIFICATE OF CORRECTION

Patent No. 3,699,054                 Dated October 17, 1972

Inventor(s) Glenn E. Organ and Ronald H. Wile

It is certified that error appears in the above-identified patent and that said Letters Patent are hereby corrected as shown below:

In column 4, line 42, after "vent", insert --, it is then freed from the volatile solvent --.

Signed and sealed this 20th day of February 1973.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,699,057   Dated October 17, 1972

Inventor(s) John J. Halko, Sr., et al

It is certified that error appears in the above-identified patent and that said Letters Patent are hereby corrected as shown below:

Column 2, line 59, --the-- should appear before "oleate".

penultimate line, "meter" should be --water--.

Claim 1, line 2, "sad" should be --said--.

Claim 3, line 4, "water-solule" should be --water-soluble--.

Signed and sealed this 8th day of May 1973.

(SEAL)
Attest:

EDWARD M.FLETCHER,JR.
Attesting Officer

ROBERT GOTTSCHALK
Commissioner of Patents